(12) United States Patent
Thorne et al.

(10) Patent No.: US 11,255,996 B2
(45) Date of Patent: Feb. 22, 2022

(54) SYSTEMS AND METHODS FOR ESTIMATING A LIKELIHOOD OF AN OBJECT ELEMENT IN A GIVEN POSITION IN A SUBSURFACE VOLUME OF INTEREST

(71) Applicant: CHEVRON U.S.A. INC., San Ramon, CA (US)

(72) Inventors: Julian Thorne, Houston, TX (US); Michael Pyrcz, Austin, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 371 days.

(21) Appl. No.: 16/378,451

(22) Filed: Apr. 8, 2019

(65) Prior Publication Data
US 2020/0319359 A1    Oct. 8, 2020

(51) Int. Cl.
*G01V 1/30*    (2006.01)
(52) U.S. Cl.
CPC .................. *G01V 1/301* (2013.01)
(58) Field of Classification Search
CPC ............... G01V 1/301; G01V 99/005
See application file for complete search history.

(56) References Cited

U.S. PATENT DOCUMENTS

| | | | |
|---|---|---|---|
| 6,003,365 A | 12/1999 | Pope et al. | |
| 8,527,445 B2* | 9/2013 | Karins | G06N 7/005 |
| | | | 706/46 |
| 2006/0052938 A1 | 3/2006 | Thorne et al. | |
| 2008/0079723 A1 | 4/2008 | Hanson et al. | |
| 2010/0306249 A1* | 12/2010 | Hill | G06Q 50/01 |
| | | | 707/769 |
| 2014/0330547 A1 | 11/2014 | Calvert et al. | |
| 2016/0103245 A1 | 4/2016 | Pyrcz et al. | |
| 2016/0238729 A1* | 8/2016 | Warner | G01V 1/364 |

OTHER PUBLICATIONS

International Search Report and Written Opinion dated May 1, 2020 for International Application No. PCT/US2020/015344, filed Jan. 28, 2020.
De Groot, P., et al., "Examples of Multi-attribute, Neural Network-based Seismic Object Detection", Geological Society, London Memoirs (2004), v. 29, p. 335-338.
De Groot, P., et al., "Adding Texture Attributes to the 3D Mix", Geophysical Corenr, AAPG Exployer, Sep. 2013, p. 68-69.
Xu, W., et al., "Integrating Seismic Data in Reservoir Modeling: the collocated cokriging alternative", SPE Annual Technical Conference and Exhibition, Oct. 4-7, 1992, Washington, D.C.

* cited by examiner

*Primary Examiner* — Bryan Bui
(74) *Attorney, Agent, or Firm* — Sheppard, Mullin, Richter & Hampton LLP (57) ABSTRACT

Systems and methods for estimating a likelihood of an object element in a given position in a subsurface volume of interest are disclosed. Exemplary implementations may: obtain target subsurface data from the subsurface volume of interest; obtain an object element set corresponding to the subsurface volume of interest; generate correlation values as a function of position in the subsurface volume of interest by applying the object filters to the target subsurface data; and generate object element likelihood values by applying the object templates to positions in the subsurface volume of interest corresponding to the correlation values.

20 Claims, 7 Drawing Sheets

SYSTEMS AND METHODS FOR ESTIMATING A LIKELIHOOD OF AN OBJECT ELEMENT IN A GIVEN POSITION IN A SUBSURFACE VOLUME OF INTEREST

FIELD OF THE DISCLOSURE

The present disclosure relates to systems and methods for estimating a likelihood of an object element in a given position in a subsurface volume of interest.

BACKGROUND

Existing technologies may integrate seismic data into models of facies at the reservoir scale to make reservoir models realistic enough to inform reservoir management decisions. Most existing technologies rely on calibrating seismic inversion products or other seismic attributes to well control on a spatial point-by-point basis. Other existing technologies have focused on textures including local window metrics such as contrast, continuity, and other summary statistics. As such, existing technologies rely on point-by-point and texture based attributes to differentiate objects from the background.

However, these methods are sensitive to trace-by-trace seismic error, ignore important geometrical information beyond local information, and often result in correlation between the seismic and well data that is too low to reliably influence reservoir models. As a result, not all relevant seismic information impacts reservoir management decisions.

SUMMARY

One aspect of the present disclosure relates to a method for estimating a likelihood of an object element in a given position in a subsurface volume of interest. The method may be implemented in a computer system that includes a physical computer processor, non-transient electronic storage, and a graphical user interface. The method may include obtaining target subsurface data from the subsurface volume of interest. The method may include obtaining an object element set corresponding to the subsurface volume of interest. The object element set may include (i) object templates specifying object elements in the subsurface volume of interest and (ii) object filters derived from the object templates. The method may include generating correlation values as a function of position in the subsurface volume of interest by applying the object filters to the target subsurface data. A given correlation value specifies a correlation between a given filter and corresponding target subsurface data. The method may include generating object element likelihood values by applying the object templates to positions in the subsurface volume of interest corresponding to the correlation values. The object templates are applied to the subsurface volume of interest based on a magnitude of the correlation values. A given object element likelihood value specifies a likelihood of a given object element at a given position in the subsurface volume of interest.

In implementations, the method may further include generating a representation of likelihoods of the object elements as a function of position in the subsurface volume of interest using visual effects to depict at least one of the object element likelihood values. The method may include displaying the representation.

In implementations, the object element features comprise one or more of a size of a given object element, a shape of the given object element, and an orientation of the given object element.

In implementations, the representation of the likelihoods corresponds to the magnitude of the correlation values.

In implementations, the representation of the likelihoods applies colors to different object element likelihood values.

In implementations, the object filters are derived from shape templates by adding values to the shape templates such that a mean value of individual ones of the object filters is zero.

In implementations, the object element set is generated by identifying the object elements in the target subsurface data; generating the object templates based on the object elements; storing the object templates; generating the object filters by ringing the object templates with values such that the mean value of individual ones of the object filters is zero; and storing the object filters.

One aspect of the present disclosure relates to a system for estimating a likelihood of an object element in a given position in a subsurface volume of interest. The system may include a non-transient electronic storage, a graphical user interface, and a physical computer processor. The physical computer processor may be configured by machine-readable instructions to perform a number of operations. One such operation may be to obtain target subsurface data from the subsurface volume of interest. Another operation may be to obtain an object element set corresponding to the subsurface volume of interest. The object element set includes (i) object templates specifying object elements in the subsurface volume of interest and (ii) object filters derived from the object templates. One operation may be to generate correlation values as a function of position in the subsurface volume of interest by applying the object filters to the target subsurface data. A given correlation value specifies a correlation between a given filter and corresponding target subsurface data. One operation may be to generate object element likelihood values by applying the object templates to positions in the subsurface volume of interest corresponding to the correlation values. The object templates are applied to the subsurface volume of interest based on a magnitude of the correlation values. A given object element likelihood value specifies a likelihood of a given object element at a given position in the subsurface volume of interest.

In implementations, another operation may be to generate a representation of likelihoods of the object elements as a function of position in the subsurface volume of interest using visual effects to depict at least one of the object element likelihood values. One operation may be to display the representation.

In implementations, the object element features comprise one or more of a size of a given object element, a shape of the given object element, and an orientation of the given object element.

In implementations, the representation of the likelihoods corresponds to the magnitude of the correlation values.

In implementations, the representation of the likelihoods applies colors to different object element likelihood values.

In implementations, the object filters are derived from shape templates by adding values to the shape templates such that a mean value of individual ones of the object filters is zero.

In implementations, the object element set is generated by identifying the object elements in the target subsurface data; generating the object templates based on the object elements; storing the object templates; generating the object filters by ringing the object templates with values such that the mean value of individual ones of the object filters is zero; and storing the object filters.

One aspect of the present disclosure relates to a non-transitory computer-readable medium for estimating a likelihood of an object element in a given position in a subsurface volume of interest. The non-transitory computer-readable medium may store instructions configured to, when executed, perform a number of operations. One operation may be to obtain target subsurface data from the subsurface volume of interest. One operation may be to obtain an object element set corresponding to the subsurface volume of interest. The object element set includes (i) object templates specifying object elements in the subsurface volume of interest and (ii) object filters derived from the object templates. One operation may be to generate correlation values as a function of position in the subsurface volume of interest by applying the object filters to the target subsurface data. A given correlation value specifies a correlation between a given filter and corresponding target subsurface data. One operation may be to generate object element likelihood values by applying the object templates to positions in the subsurface volume of interest corresponding to the correlation values. The object templates are applied to the subsurface volume of interest based on a magnitude of the correlation values. A given object element likelihood value specifies a likelihood of a given object element at a given position in the subsurface volume of interest.

In implementations, one operation may be to generate a representation of likelihoods of the object elements as a function of position in the subsurface volume of interest using visual effects to depict at least one of the object element likelihood values. One operation may be to display the representation.

In implementations, the object element features comprise one or more of a size of a given object element, a shape of the given object element, and an orientation of the given object element.

In implementations, the representation of the likelihoods corresponds to the magnitude of the correlation values.

In implementations, the representation of the likelihoods applies colors to different object element likelihood values.

In implementations, the object element set is generated by identifying the object elements in the target subsurface data; generating the object templates based on the object elements; storing the object templates; generating the object filters by ringing the object templates with values such that the mean value of individual ones of the object filters is zero; and storing the object filters.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise. The use of "angle" or "angles" is to be synonymous with "offset," unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Disclosed are systems and methods for estimating a likelihood of an object element in a given position in a subsurface volume of interest. The presently disclosed technology may exploit hit-and-miss operators and a training set of subsurface data to generate one or more object templates and/or object filters corresponding to a subsurface volume of interest. The one or more object templates may correspond to shapes of the objects in the subsurface volume of interest, and the one or more object filters may be derived from the one or more object templates to apply to the subsurface volume of interest. Remaining target subsurface data may be used to generate a channel score, or a likelihood of an object element at a given position in the subsurface volume of interest, by applying the one or more object filters to the subsurface volume of interest to generate correlation values. Using the one or more correlation values, object element likelihood values may be generated that indicate a likelihood of an object element in a given position in the subsurface volume of interest. The object element likelihood values may be used in a representation of the subsurface volume of interest. As used herein, a subsurface volume of interest may include any volume underneath a surface. Such a volume may include, or be bounded by, one or more of a water surface, a ground surface, and/or other surfaces. The subsurface volume of interest may include a reservoir, such as a conventional or unconventional reservoir.

Figure 1:
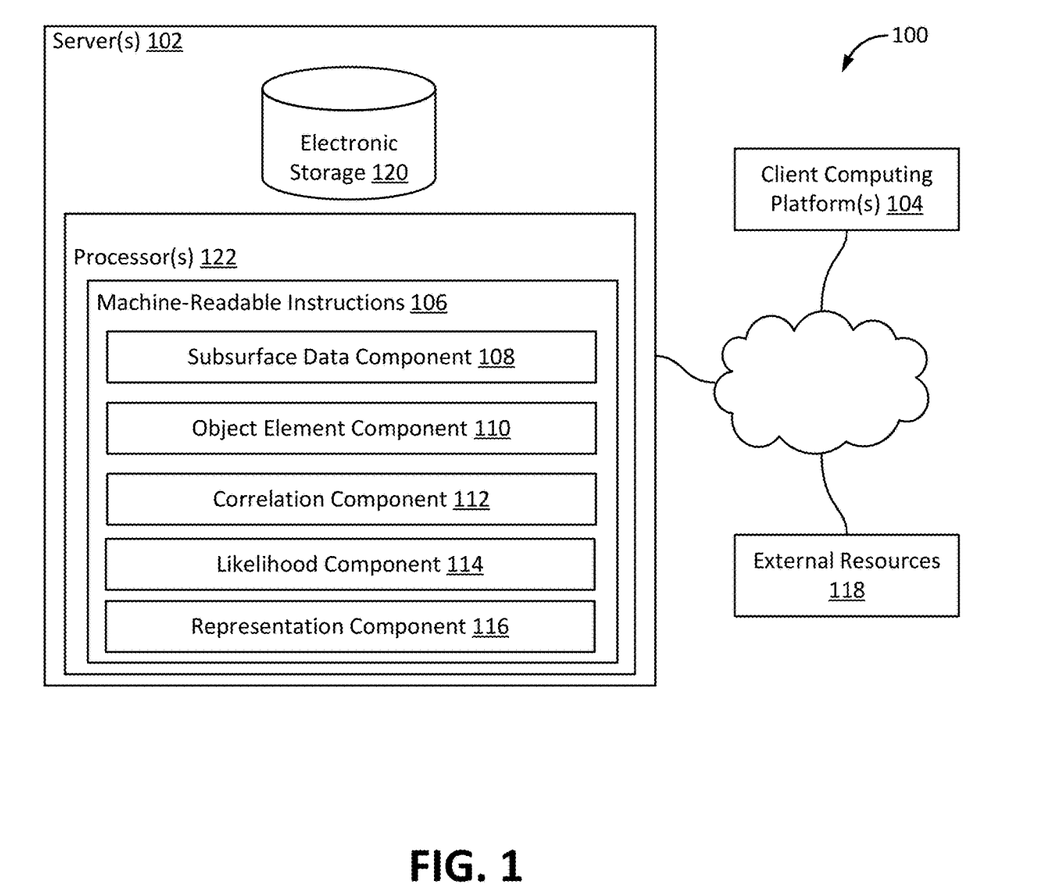
FIG. 1 illustrates a system for estimating a likelihood of an object element in a given position in a subsurface volume of interest, in accordance with one or more implementations.

FIG. 1 illustrates a system 100 for estimating a likelihood of an object element in a given position in a subsurface volume of interest, in accordance with one or more implementations. In some implementations, system 100 may include one or more servers 102. Server(s) 102 may communicate with one or more client computing platforms 104 according to a client/server architecture and/or other architectures. Client computing platform(s) 104 may communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a subsurface data component 108, an object element component 110, a correlation component 112, a likelihood component 114, a representation component 116, and/or other instruction components.

Subsurface data component 108 may obtain target subsurface data from a subsurface volume of interest. Subsurface data may include seismic data and/or well data. The presently disclosed technology may be able to identify object elements and corresponding object element features in the subsurface data. A given object element may refer to one or more different types of one or more objects in the subsurface volume of interest. An object element may be a training image used to generate an object template and corresponding object filter. The one or more object elements may include facies (i.e., the overall characteristics of a rock that reflect its origin and differentiate the unit from others around it), rock types (i.e., one or more characteristics that one or more rocks have in common), etc. Facies may include petrofacies, lithofacies, biofacies, ichnofacies, hydrofacies, and/or other facies.

The one or more object element features may include a geometry of a given object element and/or an orientation, or direction, of a given object element. A geometry may include a shape and/or a size. The one or more object element features may be defined by object element feature values. Object element feature values may include values for the geometry (e.g., no sides, three sides, four sides, five sides, a combination of different shapes, non-standard shapes, etc., as well as length of the sides, width of the sides, height of the sides, etc.) and/or orientation (e.g., a direction an object element is facing, such as north, south, east, west, and any value in between).

Figure 2:
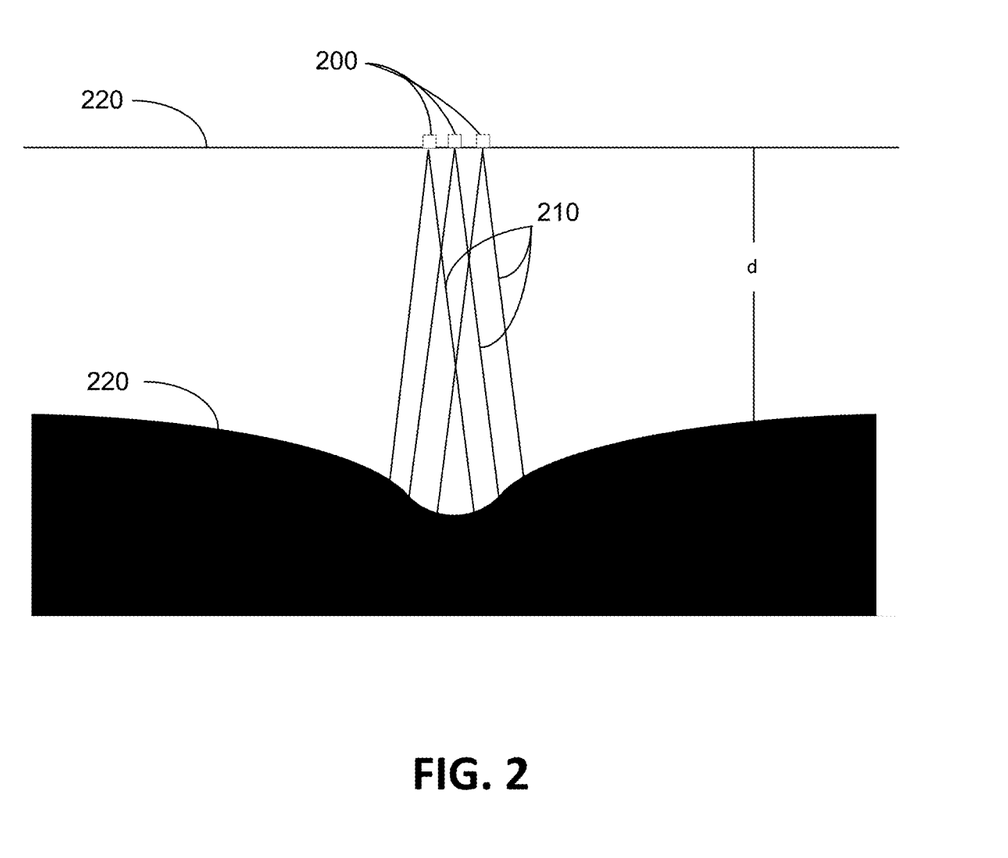
FIG. 2 illustrates an example layout to obtain subsurface data.

In some implementations, the subsurface data may be obtained using a set-up as illustrated in FIG. 2. FIG. 2 illustrates an example layout to obtain subsurface data. The subsurface data may be obtained by sending energy 210 into a subsurface volume of interest 220 using subsurface sources 200 and receiving the signal reflected off of a subsurface feature 220 at subsurface receivers 200. Zero-offset source-receiver pairs 200 may send energy waves 210 into subsurface volume 220. Energy waves 210 may reflect or refract off subsurface feature 220. Source-receiver pairs 200 may receive the reflected and refracted energy waves 210 which may be converted into subsurface amplitudes.

In some implementations, a subsurface source may send subsurface energy into the subsurface, which may then be reflected and/or refracted by subsurface features and may be recorded at subsurface receivers at various distances away from a subsurface source. Subsurface energy may include acoustic compression waves. For example, the subsurface source may generate acoustic compression waves and direct them towards a subsurface region that includes various lithologies (e.g., underground rock structures). The subsurface data may be generated from subsurface signals (e.g., the reflections of the subsurface energy off of the various subsurface lithologies) received by subsurface sensors, such as geophones and/or other acoustic detectors. The subsurface data may be stored.

Referring back to FIG. 1, object element component 110 may obtain an object element set corresponding to the subsurface volume of interest. An object element set may include one or more object templates and one or more object filters. A given object template may be based on the one or more object features. The one or more object filters may be derived from the one or more object templates by ringing the one or more object templates with values. In some implementations, the mean value of a given object filter may be zero after ringing a given object template with values. This may be accomplished by ringing the one or more object templates with negative values. It should be appreciated that different mean values for the one or more object filters may be achieved based on the values used to ring the one or more object templates.

In implementations, the object element set may be generated by identifying at least one of the object elements in the target subsurface data. This may be done manually by visually identifying more visually apparent object elements in a representation of the subsurface data. In some implementations, machine-learning algorithms may search through existing subsurface data, not necessarily limited to the subsurface volume of interest, to find object elements that may be common to multiple subsurface volumes of interest. For example, one or more object elements may be generated by examining photographs and other maps of modern depositional systems. In some implementations, the one or more object elements may be generated by examining the synthetic models of sedimentary deposits created by computational stratigraphy that forward the physical and chemical equations of sedimentation.

In some implementations, one or more object templates may be generated based on the identified object elements. Using the identified object element, an object template may be generated by generating a representation from the identified object element. For example, a two-dimensional representation may be a given slice of a three-dimensional identified object element. In some implementations, the two-dimensional representation may match a depth of the target subsurface data. In implementations, multiple two-dimensional representations may be extracted from the three-dimensional identified object element that can replicate the three-dimensional identified object element in multiple orientations. For example, the three-dimensional identified object element may be an ovoid. The multiple two-dimensional representation may be able to replicate the ovoid with slices along a short distance, a long distance, diagonal distances, etc.

The two-dimensional representations may be based on different anchor points from the three-dimensional identified object element (e.g., a center, toward an edge, etc.). It should be appreciated that the two-dimensional representations may span a sub-section of the full three-dimensional identified object.

The one or more object templates may be stored and/or used to generate one or more object filters by ringing the object templates with values, as described above. The one or more object filters may also be stored.

Correlation component 112 may generate correlation values as a function of position in the subsurface volume of interest. The correlation values may be generated by applying the one or more object filters to the target subsurface data. A given correlation value may specify a correlation between a given object filter and the target subsurface data. For example, a correlation may be positive, negative, or there may be no correlation at all. Applying the one or more object filters to the target subsurface data may include rotating, shifting, and/or scaling the one or more object filters on the target subsurface data. Individual ones of the rotations, shifts, and/or scaling of the original object filters may have separate correlation values. It should be appreciated that different anchor points may be used to rotate, shift, and/or scale the one or more object filters (e.g., center, edge, near center, near edge, etc.).

In some implementations, applying the one or more object filters may include convolving the one or more object filters around a given position in the subsurface volume of interest. Convolving the one or more object filters may generate convolution volumes. The one or more correlation values may correspond to the convolution volumes.

Likelihood component 114 may generate object element likelihood values. The one or more object element likelihood values may be generated by applying the one or more object templates to multiple positions in the subsurface volume of interest corresponding to the correlation values. The one or more object element likelihood values may correspond to the one or more magnitudes of the one or more correlation values. A given object element likelihood value may specify a likelihood of a given object element at a given position in the subsurface volume of interest. Applying the object templates may include applying an anchor point of a given object template to the corresponding position of a given correlation value.

Representation component 116 may generate a representation of likelihood of the object elements as a function of position in the subsurface volume of interest using visual effects to depict at least one of the object element likelihood values. A representation for a given object element likelihood value may appear as a given object template over a given position in a map of the subsurface volume of interest. The given object template may be a color. The color may correspond to a likelihood of the object element at the given position in the map of the subsurface volume of interest. For example, a first set of object element likelihood values may be represented by a first color gradient, a second set of object element likelihood values may be represented by a second color gradient, etc.

The representation for multiple object element likelihood values may appear as multiple object templates over individual positions in a map of the subsurface volume of interest at every position in the subsurface volume of interest. For example, multiple overlapping object templates may be displayed at a given position. Individual ones of the multiple object templates may be different colors corresponding to a likelihood of the individual ones of the multiple object elements at the given position in the map of the subsurface volume of interest.

Representation component 116 may display the representation. The representation may be displayed on a graphical user interface and/or other displays. The graphical user interface may include a user interface based on graphics instead of text; uses a mouse as well as a keyboard as an input device, according to some implementations. In implementations, a user may zoom in on and/or view one or more locations of the subsurface volume of interest to illustrate more detail on a given location.

In some implementations, a representation of an object element likelihood value with the most negative or most positive correlation may be on top of other object element likelihood values. For example, a representation of an object element likelihood value of 10 may appear stacked above a representation of an object element likelihood value of 9, and a representation of an object element likelihood value of 9 may appear stacked above a representation of an object element likelihood value of 8, etc. In one example, the opposite may be true (e.g., a representation of an object element likelihood value of −10 may appear stacked on top of a representation of an object element likelihood value of −9, a representation of an object element likelihood value of −9 may appear stacked on top of a representation of an object element likelihood value of −8, etc.). In some implementations, an absolute value of the object element likelihood value may be used before displaying the representation.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors to execute computer program components. The computer program components may enable a user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may include non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of non-transient electronic storage, optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may provide information processing capabilities in server(s) 102. As such, processor(s) 122 may include one or more of a physical computer processor, a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may execute components 108, 110, 112, 114, 116, and/or other components. Processor(s) 122 may execute components 108, 110, 112, 114, 116, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and 116 are illustrated in FIG. 1 as being implemented within a single processing unit, in implementations in which processor(s) 122 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As an example, processor(s) 122 may execute one or more additional components that may perform some or all of the functionality attributed below to one of components 108, 110, 112, 114, and/or 116.

Figure 3:
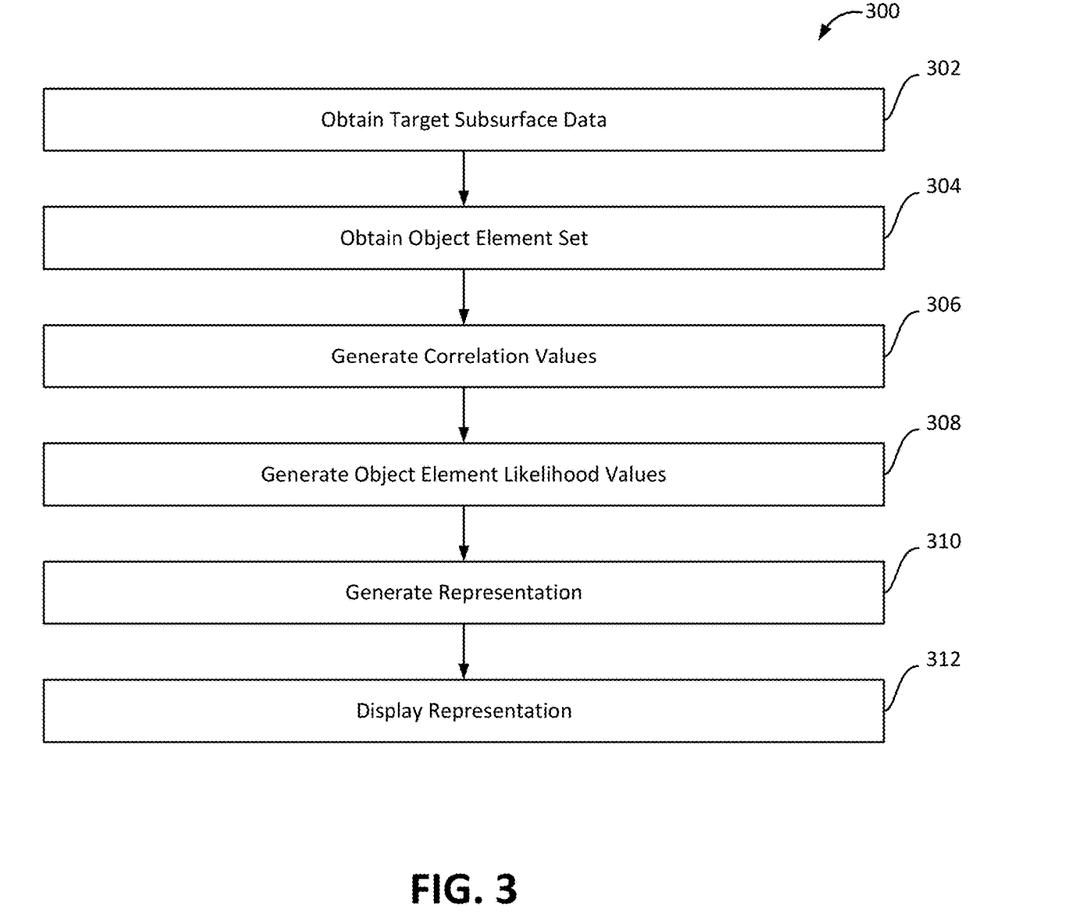
FIG. 3 illustrates a method for estimating a likelihood of an object element in a given position in a subsurface volume of interest, in accordance with one or more implementations.

FIG. 3 illustrates a method 300 for estimating a likelihood of an object element in a given position in a subsurface volume of interest, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

302 may include obtaining target subsurface data. Subsurface data may include seismic data, well data, and/or other subsurface data. The target subsurface data may include one or more object elements and corresponding object element features that may be identified by the presently disclosed technology. 302 may be performed by one or more physical computer processors configured by machine-readable instructions including a component that is the same as or similar to subsurface data component 108, in accordance with one or more implementations.

304 may include obtaining an object element set. An object element set may include one or more object templates specifying object elements in the subsurface volume of interest and one or more object filters derived from the object templates, as described above. In some implementations, as described above, an object element set may be generated by identifying one or more object elements in the subsurface volume of interest, generating the one or more object templates based on the one or more object elements, and deriving the one or more object filters from the one or more object templates. The generated object element set may be stored. 304 may be performed by one or more physical computer processors configured by machine-readable instructions including a component that is the same as or similar to object element component 110, in accordance with one or more implementations.

306 may include generating correlation values. The one or more correlation values may be generated by applying the one or more object filters to the target subsurface data. A given correlation value may specify a correlation between a given filter and corresponding target subsurface data. 306 may be performed by one or more physical computer processors configured by machine-readable instructions including a component that is the same as or similar to correlation component 112, in accordance with one or more implementations.

308 may include generating object element likelihood values. The one or more object element likelihood values may be generated by applying the one or more object templates to position in the subsurface volume of interest corresponding to the one or more correlation values. The object templates may be applied to the subsurface volume of interest based on a magnitude of the correlation values. A given object element likelihood value may specify a likelihood of a given object element at a given position in the subsurface volume of interest. 308 may be performed by one or more physical computer processors configured by machine-readable instructions including a component that is the same as or similar to likelihood component 114, in accordance with one or more implementations.

310 may include generating a representation. The representation may be of the one or more object element likelihood values as a function of position in the subsurface volume of interest. Visual effects may be used to depict at least one of the one or more object element likelihood values. The representation, in some implementations, may be a map with one or more object templates identified, where individual ones of the one or more object templates are different colors based on the magnitude of the corresponding correlation values. 310 may be performed by one or more physical computer processors configured by machine-readable instructions including a component that is the same as or similar to representation component 114, in accordance with one or more implementations.

312 may include displaying the representation. 312 may be performed by one or more physical computer processors configured by machine-readable instructions including a component that is the same as or similar to representation component 114, in accordance with one or more implementations.

In some implementations, the presently disclosed technology may initialize object element likelihood values to a value of 0 at each point (i, j, k) in the subsurface volume of interest. One or more object elements may be identified, as described herein. An object element set may be generated from at least some of the identified object elements, as described herein. An object template, which may be a two-dimensional version of the object element may be generated from a shadow of an object element with relative positions around the object element center ($P_{uv}$). The object template may be ringed with negative values such that the mean filter value is zero for the object filter. The object filter may be convolved with a subsurface parameter volume to generate a convolution volume ($C_{ijk}$). The object element may be located in the subsurface volume of interest corresponding to the convolution volume. Each object element center may have a max and a min value, wherein $Max_{i+u, j+v, k} = max(C_{ijk}, Max_{i+u, j+v, k})$ and $Min_{i+u, j+v, k} = -min(C_{i, j, k}, -Min_{i+u, j+v, k})$. The object element likelihood score may be $Max_{ijk}$ or $Min_{ijk}$ depending on whether the object elements are relative highs or lows. IT should be appreciated that this can be repeated many times to generate the object element likelihood value for multiple object elements in the subsurface volume of interest.

Figure 4:
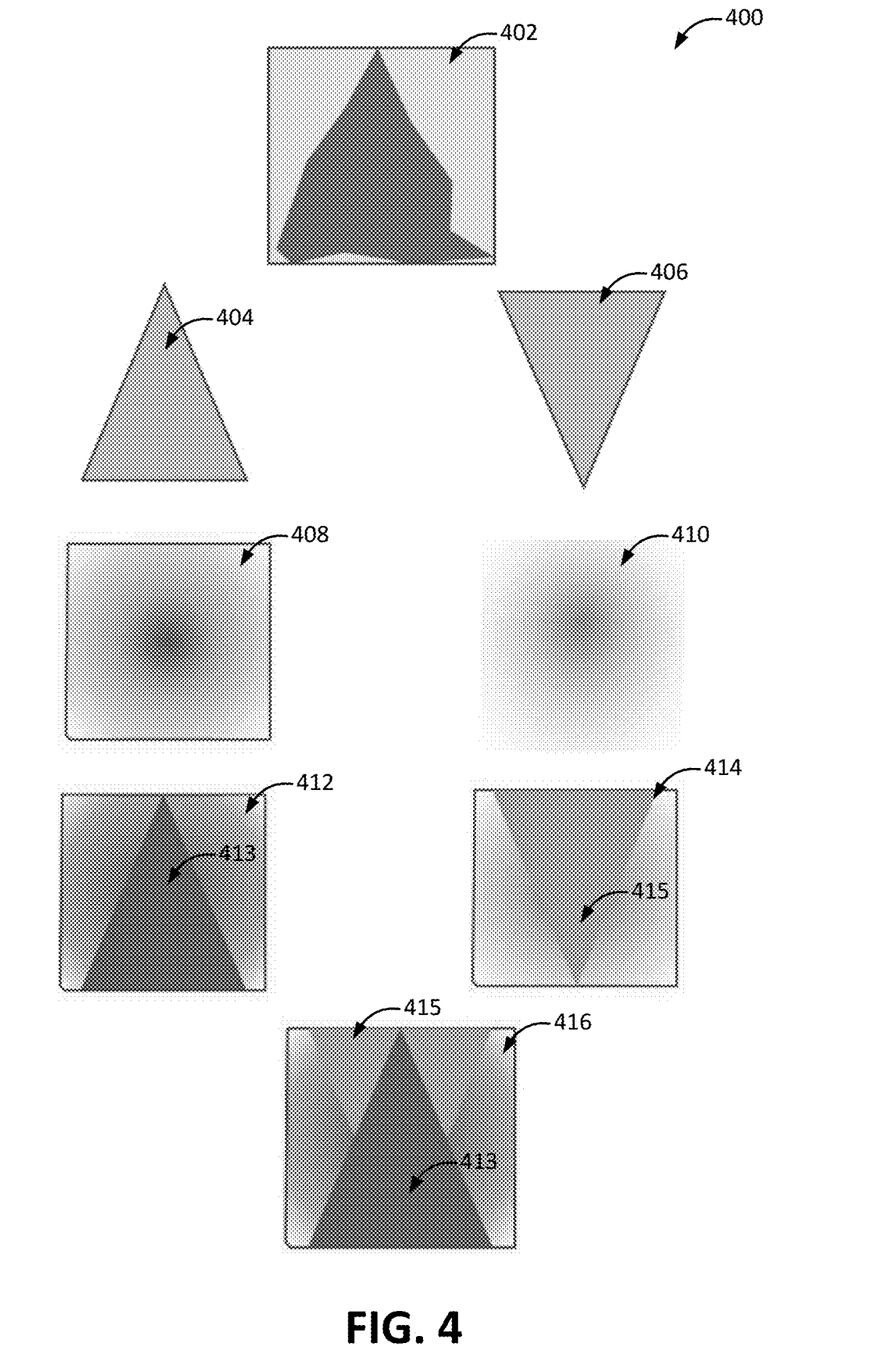
FIG. 4 illustrates an example object element, example object templates, example correlation values, and example representations, in accordance with one or more implementations.

FIG. 4 illustrates an example object element 402, example object templates 404 and 406, example correlation values 408 and 410, and example representations 412, 414 and 416, in accordance with one or more implementations. Object element 402 may represent an object element in a subsurface volume of interest. Triangle 404 and triangle 406 may represent object templates. While two orientations are illustrated, it should be appreciated that multiple, different orientations of the object templates may be used. An object filter may appear visually similar to triangle 404 and triangle 406, even though the object filters corresponding to triangle 404 and triangle 406 may be ringed with values, as described above.

Box 408 and box 410 may illustrate a representation of a magnitude of a correlation value by applying the object filters corresponding to triangle 404 and triangle 406 to object element 402. As illustrated, box 408 is darker toward the center and becomes lighter toward the edges of box 408. It may be lighter toward the edges of the box because object filters corresponding to triangle 404 were applied at different positions on object element 402. Lighter colors may indicate less correlation than darker colors. It should be appreciated that different colors may be used, and in some implementations, darker colors may indicate less of a correlation.

Box 410 is lighter than box 408. Box 410 may be lighter than box 408 because object filter corresponding to triangle 404 is more correlated to object element 402 than object filter corresponding to triangle 406 is. For example, the upward facing triangle, triangle 404, looks more like the jagged triangle, object element 402, than a downward triangle, triangle 406.

Box 412 and box 414 may illustrate a representation of individual object element likelihood values. For example, box 412 may correspond to box 408, and the shade of brown in the center of box 408 may correspond to the shade of brown on triangle 413 placed in the center of box 412. Similarly, box 414 may correspond to box 410, and the shade of brown in the center of box 410 may correspond to the shade of brown on triangle 415 placed in the center of box 414.

Box 416 may illustrate an example representation of multiple object element likelihood values. As illustrated, triangle 413 may appear stacked on top of triangle 415 because there is a stronger correlation between triangle 404 with object 402 than triangle 406 with object element 402. As described above, in some implementations, the opposite may be displayed.

Figure 5:
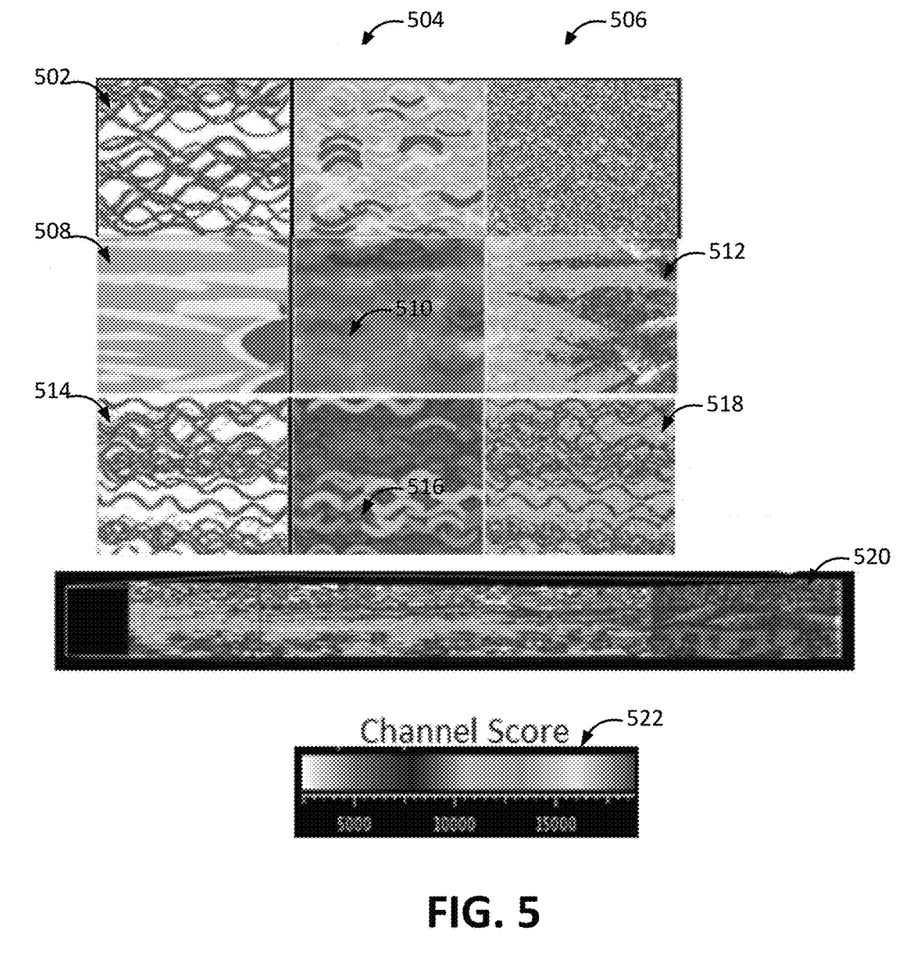
FIG. 5 illustrates example representations, in accordance with one or more implementations.

FIG. 5 illustrates example representations 500, in accordance with one or more implementations. Example representations 500 may represent an object element set including three different object templates. 502 may illustrate a representation of subsurface data with distinct channels. 504 may illustrate corresponding object element likelihood values for 502, which may indicate isolated, disorganized channels. 506 may represent the impedance in the subsurface data.

508 may illustrate a representation of subsurface data with distinct lobes. 510 may illustrate corresponding object element likelihood values for 508, which may indicate large lobes with continuous trends. 512 may represent the impedance in the subsurface data.

514 may illustrate a representation of subsurface data with indistinct channels. 516 may illustrate corresponding object element likelihood values for 514, which may indicate disorganized channels with less contrast with overbank. 518 may represent the impedance in the subsurface data.

Shaded part 520 of the subsurface data represented as a bar illustrates a synthetic model on which 502, 504, 506, 508, 510, 512, 514, 516, and 518 are based. 522 may illustrate a color bar where a given color corresponds to an object element likelihood value. As illustrated, the object element likelihood values may be able to distinguish different object elements in a synthetic model including lobe shapes and channel shapes.

Figure 6:
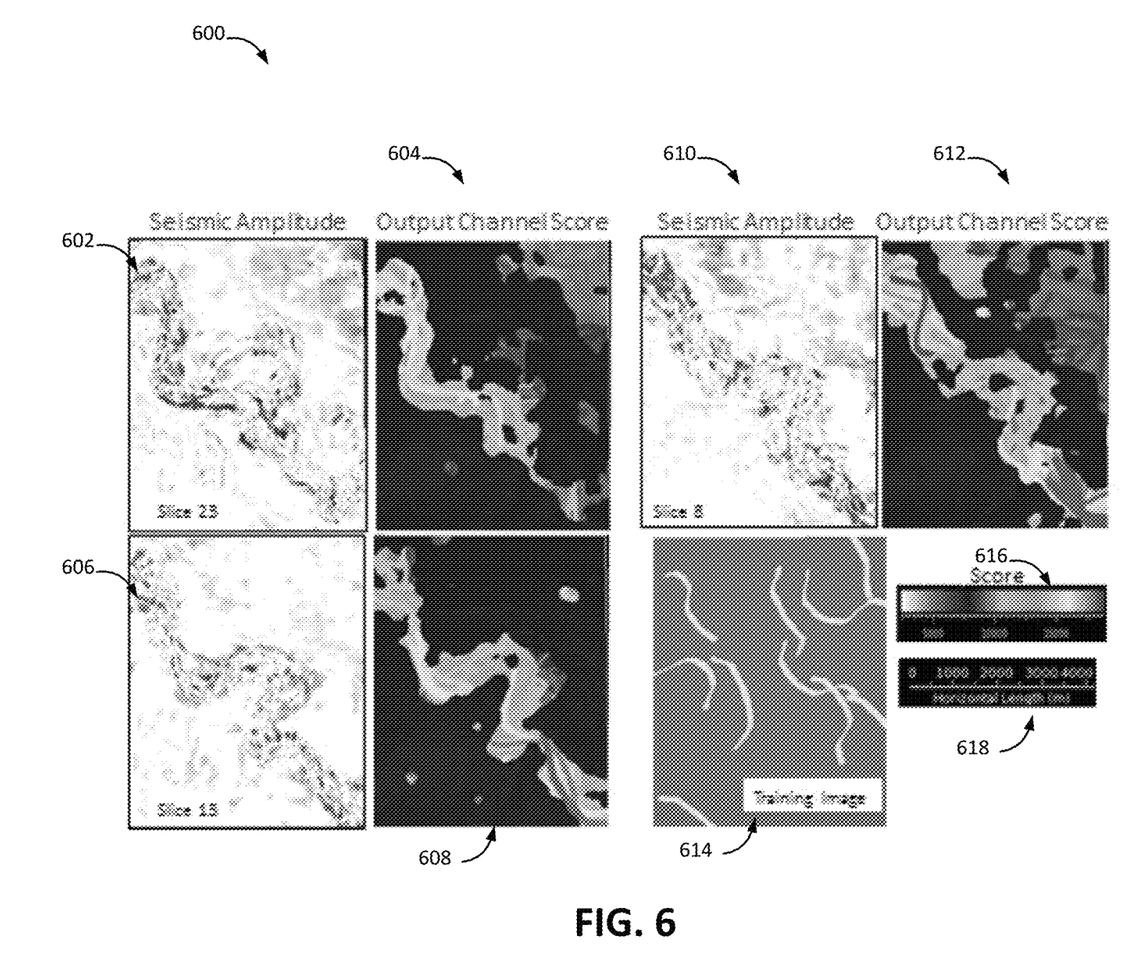
FIG. 6 illustrates example representations, in accordance with one or more implementations.

FIG. 6 illustrates example representations, in accordance with one or more implementations. Example representations 600 may illustrate confined channels within a deepwater canyon. 602 may illustrate a representation of subsurface data. The subsurface data may be a slice of the subsurface volume of interest. 604 may illustrate a representation of the corresponding object element likelihood values for 602 identifying a canyon.

606 may illustrate a representation of subsurface data. 608 may illustrate a representation of the corresponding object element likelihood values for 606 identifying a canyon.

610 may illustrate a representation of subsurface data. 612 may illustrate a representation of the corresponding object element likelihood values for 610 identifying a canyon.

614 may include the one or more object elements identified in yellow. The one or more object elements may be used to generate the one or more object templates and/or derive the one or more object filters. 616 may be a color bar indicating colors corresponding to different object element likelihood values in example representation 600. 618 may provide a scale for the subsurface data and the representations, indicating how much distance on the representation corresponds to a real-world distance. As illustrated in example representation 600, the volume outside the canyon is given a low object element likelihood value, and the volume within the canyon is given a higher object element likelihood value.

Figure 7:
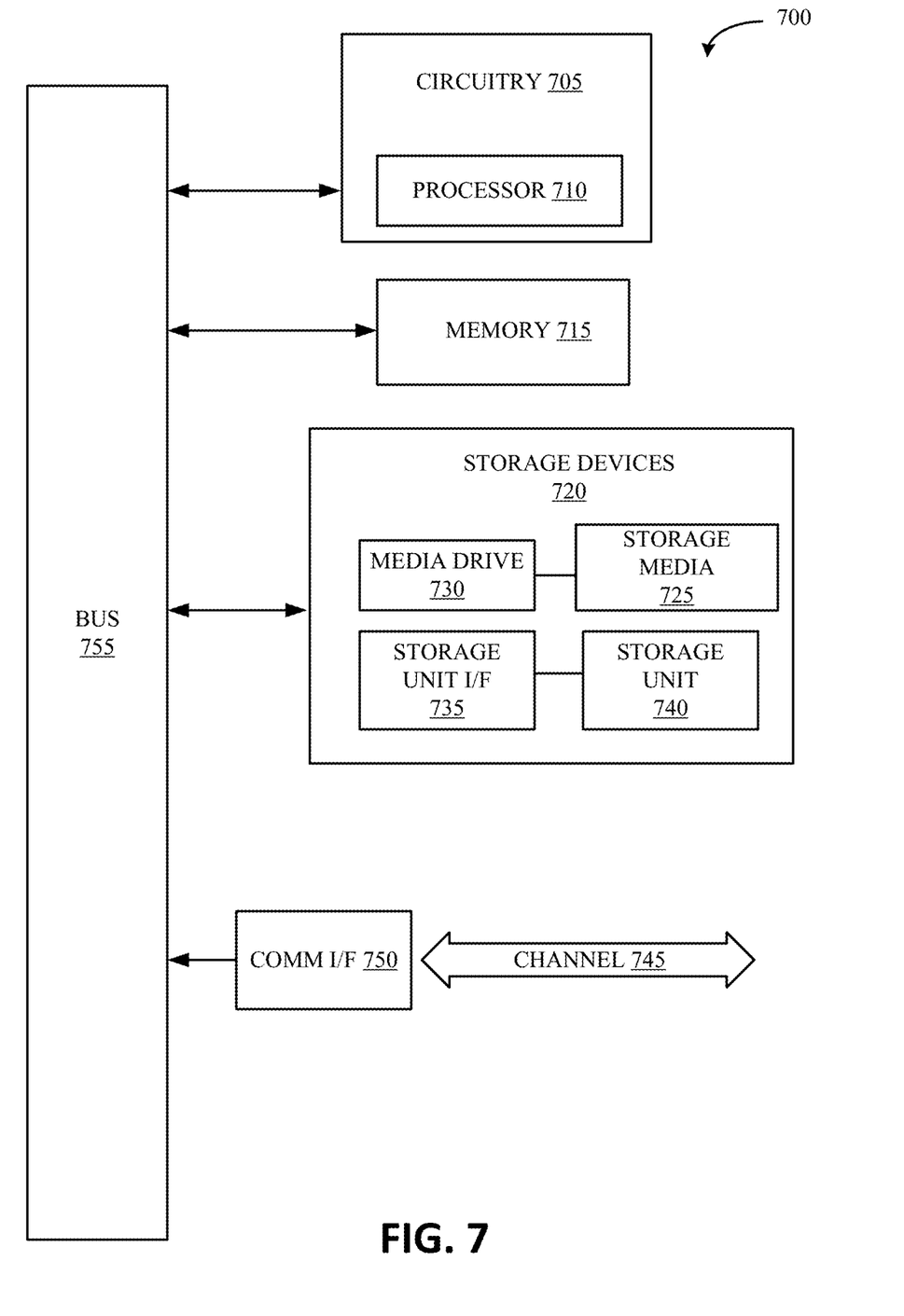
FIG. 7 is an example computing component that may be used to implement various features of implementations described in the present disclosure.

As used herein, the term component might describe a given unit of functionality that can be performed in accordance with one or more implementations of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one implementation, these software elements can be implemented to operate with a computing or processing component capable of carrying out the functionality described with respect thereto. One such example computing component is shown in FIG. 7. Various implementations are described in terms of this example-computing component 700. After reading this description, it will become apparent to a person skilled in the relevant art how to implement the technology using other computing components or architectures.

Referring now to FIG. 7, computing component 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 700 is specifically purposed.

Computing component 700 may include, for example, one or more processors, controllers, control components, or other processing devices, such as a processor 710, and such as may be included in circuitry 705. Processor 710 may be implemented using a special-purpose processing component such as, for example, a microprocessor, controller, or other control logic. In the illustrated example, processor 710 is connected to bus 755 by way of circuitry 705, although any communication medium may be used to facilitate interaction with other components of computing component 700 or to communicate externally.

Computing component 700 may also include one or more memory components, simply referred to herein as main memory 715. For example, random access memory (RAM) or other dynamic memory may be used for storing information and instructions to be executed by processor 710 or circuitry 705. Main memory 715 may also be used for storing temporary variables or other intermediate information during execution of instructions to be executed by processor 710 or circuitry 705. Computing component 700 may likewise include a read only memory (ROM) or other static storage device coupled to bus 755 for storing static information and instructions for processor 710 or circuitry 705.

Computing component 700 may also include one or more various forms of information storage devices 720, which may include, for example, media drive 730 and storage unit interface 735. Media drive 730 may include a drive or other mechanism to support fixed or removable storage media 725. For example, a hard disk drive, a floppy disk drive, a magnetic tape drive, an optical disk drive, a CD or DVD drive (R or RW), or other removable or fixed media drive may be provided. Accordingly, removable storage media 725 may include, for example, a hard disk, a floppy disk, magnetic tape, cartridge, optical disk, a CD or DVD, or other fixed or removable medium that is read by, written to, or accessed by media drive 730. As these examples illustrate, removable storage media 725 may include a computer usable storage medium having stored therein computer software or data.

In alternative implementations, information storage devices 720 may include other similar instrumentalities for allowing computer programs or other instructions or data to be loaded into computing component 700. Such instrumentalities may include, for example, fixed or removable storage unit 740 and storage unit interface 735. Examples of such removable storage units 740 and storage unit interfaces 735 may include a program cartridge and cartridge interface, a removable memory (for example, a flash memory or other removable memory component) and memory slot, a PCMCIA slot and card, and other fixed or removable storage units 740 and storage unit interfaces 735 that allow software and data to be transferred from removable storage unit 740 to computing component 700.

Computing component 700 may also include a communications interface 750. Communications interface 750 may be used to allow software and data to be transferred between computing component 700 and external devices. Examples of communications interface 750 include a modem or soft-modem, a network interface (such as an Ethernet, network interface card, WiMedia, IEEE 702.XX, or other interface), a communications port (such as for example, a USB port, IR port, RS232 port Bluetooth® interface, or other port), or other communications interface. Software and data transferred via communications interface 750 may typically be carried on signals, which may be electronic, electromagnetic (which includes optical) or other signals capable of being exchanged by a given communications interface 750. These signals may be provided to/from communications interface 750 via channel 745. Channel 745 may carry signals and may be implemented using a wired or wireless communication medium. Some non-limiting examples of channel 745 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 715, storage unit interface 735, removable storage media 725, and channel 745. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 700 or a processor to perform features or functions of the present application as discussed herein.

While various implementations of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various implementations be implemented to perform the recited functionality in the same order unless the context dictates otherwise.

Although the disclosed technology is described above in terms of various exemplary implementations and implementations, it should be understood that the various features, aspects, and functionality described in one or more of the individual implementations are not limited in their applicability to the particular implementation with which they are described, but instead can be applied, alone or in various combinations, to one or more of the other implementations of the disclosed technology, whether or not such implementations are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations set forth herein are described in terms of exemplary block diagrams, flow charts, and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

What is claimed is:

1. A computer-implemented method for estimating a likelihood of an object element in a given position in a subsurface volume of interest, the method being implemented in a computer system that includes a physical computer processor, non-transient electronic storage, and a graphical user interface, the method comprising:
   obtaining, from the non-transient electronic storage, target subsurface data from the subsurface volume of interest;
   obtaining, from the non-transient electronic storage, an object element set corresponding to the subsurface volume of interest, wherein the object element set includes (i) object templates specifying object elements in the subsurface volume of interest and (ii) object filters derived from the object templates;
   generating, with the physical computer processor, correlation values as a function of position in the subsurface volume of interest by applying the object filters to the target subsurface data as a function of position using geometric manipulation, wherein a given correlation value specifies a correlation between a given object filter and corresponding target subsurface data; and
   generating, with the physical computer processor, object element likelihood values by applying the object templates to positions in the subsurface volume of interest corresponding to the correlation values, wherein the object templates are applied to the subsurface volume of interest based on a magnitude of the correlation values, and wherein a given object element likelihood value estimates a likelihood of a given object element at a given position in the subsurface volume of interest.

2. The computer-implemented method of claim 1, further comprising:
   generating, with the physical computer processor, a representation of likelihoods of the object elements as a function of position in the subsurface volume of interest using visual effects to depict at least one of the object element likelihood values; and
   displaying, via the graphical user interface, the representation.

3. The computer-implemented method of claim 1, wherein the object element features comprise one or more of a size of a given object element, a shape of the given object element, and an orientation of the given object element.

4. The computer-implemented method of claim 1, wherein the representation of the likelihoods corresponds to the magnitude of the correlation values.

5. The computer-implemented method of claim 1, wherein the representation of the likelihoods applies colors to different object element likelihood values.

6. The computer-implemented method of claim 1, wherein the object filters are derived from shape templates by adding values to the shape templates such that a mean value of individual ones of the object filters is zero.

7. The computer-implemented method of claim 1, wherein the object element set is generated by:
   identifying, with the physical computer processor, the object elements in the target subsurface data;
   generating, with the physical computer processor, the object templates based on the object elements;
   storing, in the non-transient electronic storage, the object templates;
   generating, with the physical computer processor, the object filters by ringing the object templates with values such that the mean value of individual ones of the object filters is zero; and
      storing, in the non-transient electronic storage, the object filters.

8. A system for estimating a likelihood of an object element in a given position in a subsurface volume of interest, the system comprising:
   a non-transient electronic storage;
   a graphical user interface; and
   a physical computer processor configured by machine-readable instructions to:
   obtain, from the non-transient electronic storage, target subsurface data from the subsurface volume of interest;
   obtain, from the non-transient electronic storage, an object element set corresponding to the subsurface volume of interest, wherein the object element set includes (i) object templates specifying object elements in the subsurface volume of interest and (ii) object filters derived from the object templates;
   generate, with the physical computer processor, correlation values as a function of position in the subsurface volume of interest by applying the object filters to the target subsurface data as a function of position using geometric manipulation, wherein a given correlation value specifies a correlation between a given object filter and corresponding target subsurface data; and
   generate, with the physical computer processor, object element likelihood values by applying the object templates to positions in the subsurface volume of interest corresponding to the correlation values, wherein the object templates are applied to the subsurface volume of interest based on a magnitude of the correlation values, and wherein a given object element likelihood value estimates a likelihood of a given object element at a given position in the subsurface volume of interest.

9. The system of claim 8, wherein the physical computer processor is further configured by machine-readable instructions to:
   generate, with the physical computer processor, a representation of likelihoods of the object elements as a function of position in the subsurface volume of interest using visual effects to depict at least one of the object element likelihood values; and
   display, via the graphical user interface, the representation.

10. The system of claim 8, wherein the object element features comprise one or more of a size of a given object element, a shape of the given object element, and an orientation of the given object element.

11. The system of claim 8, wherein the representation of the likelihoods corresponds to the magnitude of the correlation values.

12. The system of claim 8, wherein the representation of the likelihoods applies colors to different object element likelihood values.

13. The system of claim 8, wherein the object filters are derived from shape templates by adding values to the shape templates such that a mean value of individual ones of the object filters is zero.

14. The system of claim 8, wherein the object element set is generated by:
   identifying, with the physical computer processor, the object elements in the target subsurface data;
   generating, with the physical computer processor, the object templates based on the object elements;
   storing, in the non-transient electronic storage, the object templates;
   generating, with the physical computer processor, the object filters by ringing the object templates with values such that the mean value of individual ones of the object filters is zero; and
      storing, in the non-transient electronic storage, the object filters.

15. A non-transitory computer-readable medium storing instructions for estimating a likelihood of an object element in a given position in a subsurface volume of interest, the instructions configured to, when executed:
   obtain, from the non-transient electronic storage, target subsurface data from the subsurface volume of interest;
   obtain, from the non-transient electronic storage, an object element set corresponding to the subsurface volume of interest, wherein the object element set includes (i) object templates specifying object elements in the subsurface volume of interest and (ii) object filters derived from the object templates;
   generate, with the physical computer processor, correlation values as a function of position in the subsurface volume of interest by applying the object filters to the target subsurface data as a function of position using geometric manipulation, wherein a given correlation value specifies a correlation between a given object filter and corresponding target subsurface data; and
   generate, with the physical computer processor, object element likelihood values by applying the object templates to positions in the subsurface volume of interest corresponding to the correlation values, wherein the object templates are applied to the subsurface volume of interest based on a magnitude of the correlation values, and wherein a given object element likelihood value estimates a likelihood of a given object element at a given position in the subsurface volume of interest.

16. The non-transitory computer-readable medium of claim 15, further storing instructions configured to, when executed:
   generate, with the physical computer processor, a representation of likelihoods of the object elements as a function of position in the subsurface volume of interest using visual effects to depict at least one of the object element likelihood values; and
   display, via the graphical user interface, the representation.

17. The non-transitory computer-readable medium of claim 15, wherein the object element features comprise one or more of a size of a given object element, a shape of the given object element, and an orientation of the given object element.

18. The non-transitory computer-readable medium of claim 15, wherein the representation of the likelihoods corresponds to the magnitude of the correlation values.

19. The non-transitory computer-readable medium of claim 15, wherein the representation of the likelihoods applies colors to different object element likelihood values.

20. The non-transitory computer-readable medium of claim 15, wherein the object element set is generated by:
- identifying, with the physical computer processor, the object elements in the target subsurface data;
- generating, with the physical computer processor, the object templates based on the object elements;
- storing, in the non-transient electronic storage, the object templates;
- generating, with the physical computer processor, the object filters by ringing the object templates with values such that the mean value of individual ones of the object filters is zero; and
- storing, in the non-transient electronic storage, the object filters.

* * * * *